(12) United States Patent
Lloyd

(10) Patent No.: US 8,633,831 B2
(45) Date of Patent: Jan. 21, 2014

(54) SINGLE-WIRE TELEMETRY AND COMMAND

(75) Inventor: David W. Lloyd, South Pasadena, CA (US)

(73) Assignee: The Boeing Company, Chicago, IL (US)

( * ) Notice: Subject to any disclaimer, the term of this patent is extended or adjusted under 35 U.S.C. 154(b) by 1303 days.

(21) Appl. No.: 11/774,426

(22) Filed: Jul. 6, 2007

(65) Prior Publication Data

US 2009/0008503 A1   Jan. 8, 2009

(51) Int. Cl.
  G06F 17/00   (2006.01)
  B64G 1/00   (2006.01)

(52) U.S. Cl.
  USPC .............. 340/870.01; 340/825; 340/825.69; 710/305; 455/69

(58) Field of Classification Search
  USPC ............ 340/870.01, 825.69, 825; 710/305; 455/69
  See application file for complete search history.

(56) References Cited

U.S. PATENT DOCUMENTS

| | | | | |
|---|---|---|---|---|
| 3,696,338 A * | 10/1972 | Preiss | | 710/60 |
| 4,607,257 A * | 8/1986 | Noguchi | | 340/825.69 |
| 5,016,631 A * | 5/1991 | Hogrefe | | 607/2 |
| 5,278,785 A * | 1/1994 | Hazani | | 365/185.16 |
| 5,874,930 A * | 2/1999 | McRobert et al. | | 345/44 |
| 6,268,827 B1 * | 7/2001 | Paschen et al. | | 342/372 |
| 6,502,212 B1 * | 12/2002 | Coyle et al. | | 714/43 |
| 6,636,933 B1 * | 10/2003 | MacLellan et al. | | 710/317 |
| 7,701,891 B2 * | 4/2010 | Barnhart et al. | | 370/316 |
| 7,761,636 B2 * | 7/2010 | Mott et al. | | 710/240 |
| 2002/0084934 A1 * | 7/2002 | Vail et al. | | 342/372 |
| 2003/0017827 A1 * | 1/2003 | Ciaburro et al. | | 455/427 |
| 2003/0114178 A1 * | 6/2003 | Chapelle et al. | | 455/517 |
| 2004/0130478 A1 * | 7/2004 | Gounalis | | 342/14 |
| 2005/0060474 A1 * | 3/2005 | Eng | | 710/305 |
| 2009/0207862 A1 * | 8/2009 | Underwood | | 370/498 |

FOREIGN PATENT DOCUMENTS

JP   57188194   11/1982

OTHER PUBLICATIONS

PCT International Search Report and Written Opinion of the International Searching Authority.

* cited by examiner

Primary Examiner — Hai Phan
Assistant Examiner — Amine Benlagsir
(74) Attorney, Agent, or Firm — Hope Baldauff, LLC

(57) ABSTRACT

Communication between a payload services unit (PSU) and a payload unit utilizes a single-wire interface used to power the PSU as well as to communicate telemetry and command signals. A telemetry and command (T&C) system includes a payload unit configured to respond to a plurality of commands and generate a plurality of telemetry data, an embedded service module (ESM) within the payload unit, and a payload service unit (PSU) configured to generate the plurality of commands and receive the plurality of telemetry data. A single-wire interface is coupled between the ESM and the PSU and configured to provide power to the ESM, wherein the payload unit and PSU are configured to communicate the plurality of commands and the plurality of the telemetry data over the single-wire interface.

19 Claims, 5 Drawing Sheets

SINGLE-WIRE TELEMETRY AND COMMAND

TECHNICAL FIELD

The embodiments described herein generally relate to telemetry and command, and more particularly relate to systems and methods for improving communication between payload service units and their associated payloads.

BACKGROUND

Telemetry and command (T&C) subsystems provide the functional interface between a satellite or other such spacecraft and ground command (or base unit). Telemetry data describing the status, configuration, and health of the spacecraft payload is received, while commands are issued to the subsystem through conventional radio frequency (RF) communication methods.

Satellites and other such systems have, in recent years, become increasingly more complicated. For example, satellites have evolved from simple repeaters of limited capabilities and minimal resource demands to highly-capable and complex multi-mission platforms. This increase in capabilities has been accompanied by a corresponding increase in T&C input/output requirements.

Using traditional approaches to connectivity and processing methods, T&C subsystems have thus become substantially more complex and difficult to use. In a typical "one wire/one function" system, for each discrete telemetry measurement, a dedicated output circuit, point-to-point wire, and input buffer/channel are employed to facilitate sampling and encoding. Similarly, each command or discrete state-change execution requires a dedicated circuit, wire, and input buffer/receiver. This model results in functional simplicity, but a large number of individual wires and circuit subsystems (e.g., thousands of individual wires).

In a "three-wire serialization" system, for low-speed serial telemetry data, a dedicated output circuit, five point-to-point wires, input buffers, and a single channel are employed to facilitate data transfer. For high-speed serial command data, a dedicated output circuit, three point-to-points wires, input buffers, and a single channel are used. This model results in a rigid process, low speed, limited capability, and medium complexity.

In a "digital databus serialization" system, serial data for both telemetry and command data for multiple devices are communicated over a single databus. Such multi-wire databus systems provide high speed, and are flexible, but require a high level of user complexity.

Accordingly, it is desirable to provide simplified telemetry and command interfaces. Other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for single-wire communication between a payload services unit (PSU) and a payload unit, wherein a single-wire interface is used for powering the PSU as well as communicating (sending and receiving) telemetry and command signals. In accordance with one embodiment, a telemetry and command (T&C) system includes a payload unit configured to respond to a plurality of commands and generate a plurality of telemetry data, an embedded service module (ESM) within the payload unit, and a payload service unit (PSU) configured to generate the plurality of commands and receive the plurality of telemetry data. A single-wire interface is coupled between the ESM and the PSU and configured to provide power to the ESM, wherein the payload unit and PSU are configured to communicate the plurality of commands and the plurality of the telemetry data therebetween over the single-wire interface. A verification subsystem may be used to indicate whether the ESM is coupled to the correct PSU.

In particular, according to one embodiment, a telemetry and command system includes a payload unit configured to respond to a plurality of commands and generate a plurality of telemetry data. An embedded service module (ESM) is coupled to the payload unit, and a payload service unit (PSU) configured to generate the plurality of commands and receive the plurality of telemetry data. A single-wire interface is coupled between the ESM and the PSU, and is configured to provide power to the ESM and to communicate the plurality of telemetry data and the plurality of commands between the ESM and the PSU.

According to another embodiment, a method for communicating telemetry and command signals includes providing a payload unit configured to respond to a plurality of commands and to generate a plurality of telemetry data, the payload unit having an embedded service module (ESM) embedded therein, and providing a payload service unit (PSU) configured to generate the plurality of commands and receive the plurality of telemetry data. The method further includes connecting a single-wire interface between the ESM and the PSU, powering the ESM over the single-wire interface via a signal associated with the plurality of commands, and transmitting and receiving the plurality of commands and the plurality of telemetry data entirely over the single-wire interface, and powering the ESM.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
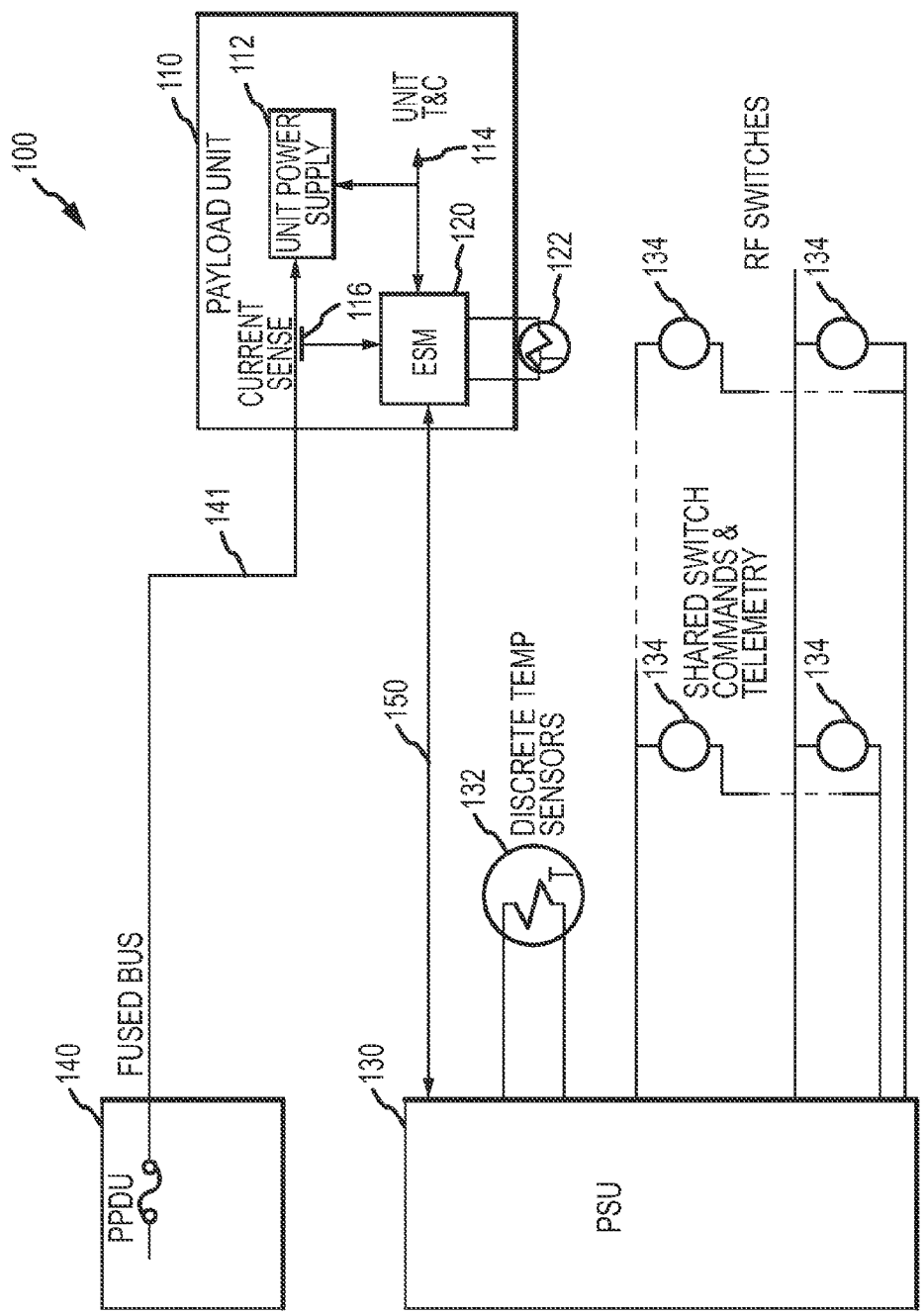
FIG. 1 is a conceptual overview of a telemetry and command system in accordance with one embodiment.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description. In the interest of conciseness, conventional techniques, structures, and principles known by those skilled in the art may not be described herein.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" or "connecting" means that one element/node/feature is directly joined to (or directly communicates with) another element/node/feature, but not necessarily mechanically. Likewise, unless expressly stated otherwise, "coupled" or "coupling" means that one element/node/feature is directly or indirectly joined to (or directly or indirectly communicates with) another element/node/feature, but not necessarily mechanically.

The terms "comprise," "comprising," "include," "have" and any variations thereof are used synonymously to denote non-exclusive inclusion. The terms "left," right," "in," "out," "front," "back," "up," "down," and other such directional terms are used to describe relative positions, not necessarily absolute positions in space. The term "exemplary" is used in the sense of "example," rather than "ideal."

In general, the various embodiments described herein relate to an improved telemetry and command (T&C) system that utilizes a single-wire interface that handles bidirectional data communication while at the same time providing power to the embedded service modules (ESMs) embedded within their respective payload services units (PSUs).

FIG. 1 is a conceptual overview of a T&C system in accordance with one embodiment. In general, as shown, a payload unit 110 includes a unit power supply 112 and an ESM 120, which communicate (via data link 114) with the various sensors, subsystems, and other entities (not shown) that produce telemetry data and can respond to various commands. ESM 120 may also be coupled to various individual sensors, such as a temperature sensor 122. Payload unit 110 may receive power (sensed by ESM 120 via a current sense component 116) via line 141 (e.g., fused bus) connected to a payload power distribution unit (PPDU) 140. Such PPDUs are known in the art, and need not be discussed in detail herein.

Payload unit 110 communicates with PSU 130 via data link (or simply "interface") 150. As discussed in further detail below, interface 150 is a single-wire interface that provides bidirectional data communication between PSU 130 and ESM 120 (and thus payload unit 110), and at the same time is configured to provide power to ESM 120.

ESM 120 is preferably embedded or otherwise incorporated into payload unit 110. This might involve ESM being located within a housing associated with the payload unit, and/or attached to a board within the payload unit. ESM 120 may be removably or permanently embedded within ESM 120.

PSU 130 includes any combination of hardware and software configured to provide the desired functionality. In general, PSU 130 coordinates the sending of commands to payload unit 110 as well as the acquisition of telemetry data generated thereby. PSU is coupled to a plurality of RF switches 134 (e.g., shared switches) that may be used to provided wireless RF communication with external subsystems. PSU 130 may also be coupled to one or more individual sensors, such as a temperature sensor 132.

During normal operation, PSU 130 generates commands and transmits the commands to ESM 120 entirely via interface 150. ESM 120, as described in further detail below, receives the commands and communicates them as appropriate to the various subsystems associated with payload unit 110, which has ESM 120 embedded therein. Telemetry data received from these subsystems are then received by ESM 120 (via data link line or lines 114) and transmitted to PSU 130 via interface 150. These commands may be analog or digital, and may be transmitted in accordance with any suitable protocol or protocols.

A variety of contiguous conductors or wires may be used in connection with single-wire interface 150. Thus, interface 150 may have any convenient length and gauge, and may comprise any suitable conductive material. In one embodiment, for example, a line with a maximum equivalent line capacitance of approximately 7200 pF (picoFarad) is used, consisting of a single unshielded wire (thus minimizing spacecraft wire harness weight and cost). A shielded wire may also be used, for example, if nearby electronic units are sensitive to RF interference. Note that the term "single wire" is not intended to exclude the use of multiple conductive strands within a particular interface.

Figure 2:
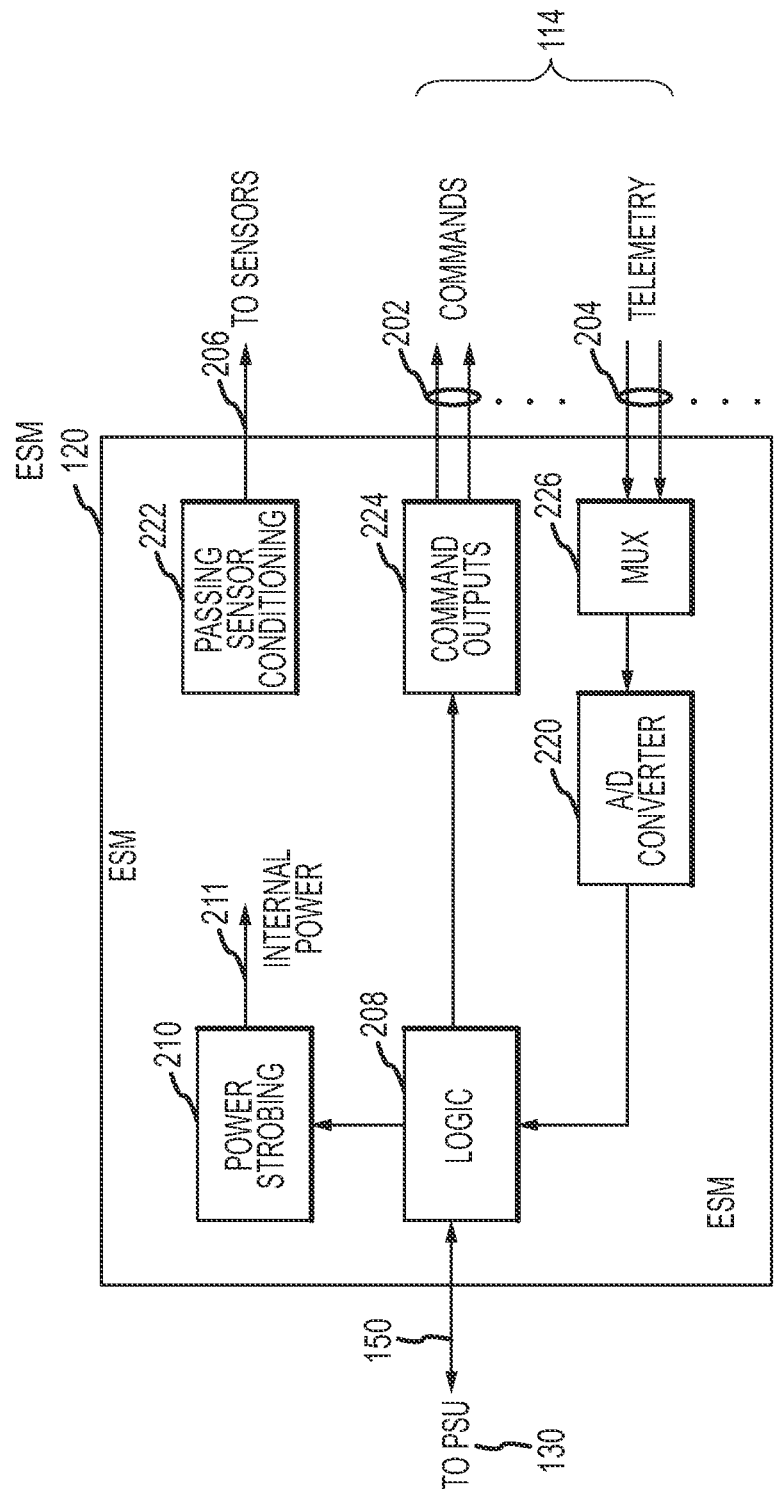
FIG. 2 is a block diagram of an exemplary embedded service module (ESM)

FIG. 2 shows a block diagram of an exemplary ESM 120. Logic 208 (which may include any combination of hardware, software, and firmware as with the other functional blocks illustrated in this figure, receives and sends commands to PSU 130 over single-wire interface 150. In one embodiment, for example, ESM 120 consists of a single mixed-signal application-specific integrated circuit (ASIC) chip.

Logic 208 is coupled to power strobing module 210, which provides internal power 211 to the various components within ESM 120 as described in further detail below. Telemetry information 204 from various sources is received by logic 208 through multiplexer 226 and an A/D converter 220. Similarly, commands 202 are produced by command outputs module 224 responsive to logic 208. A passive sensor conditioning module 222 (e.g., including one or more current or voltage sources) may be included for energizing or otherwise interfacing with various sensors 206—e.g., resistive sensors and other types of sensors that require an external power source.

Power strobing module 210 includes any combination of components able to store, in response to a stream of bits having a predetermined or predefined value, a suitable voltage for the duration of a T&C communication event. A capacitive storage element may be used to power the system; in one embodiment, for example, a storage capacitor is used in a known manner to store a charge that is regulated (e.g. via a linear regulator) to provide internal power 211.

Figure 3:
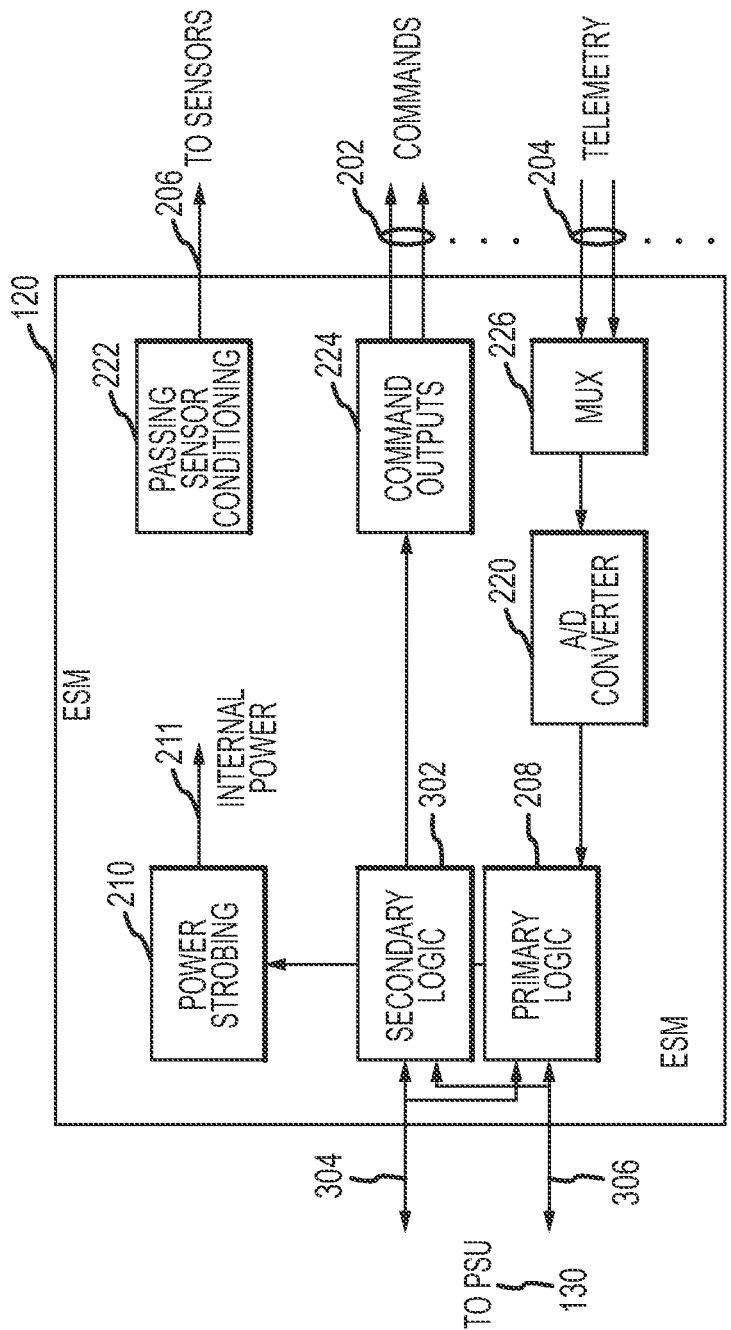
FIG. 3 is a block diagram of an alternate ESM including redundant logic.

FIG. 3 shows an alternate embodiment employing redundant connections (i.e., two or more single-wire interfaces) between PSU 130 and ESM 120. Thus, ESM 120 includes secondary logic 302 coupled to primary logic 208 redundantly coupled to PSU 130 via interfaces 304 and 306. Thus, if one of the logic modules 302 or 208 should become non-operational, the ESM can accommodate this failure and operate in a normal fashion. In this embodiment, primary logic 208 is coupled to A/D converter 220, while secondary logic 302 is coupled to power strobing subsystem 210 and command outputs module 224. Other configurations, however, may be employed.

Figure 4:
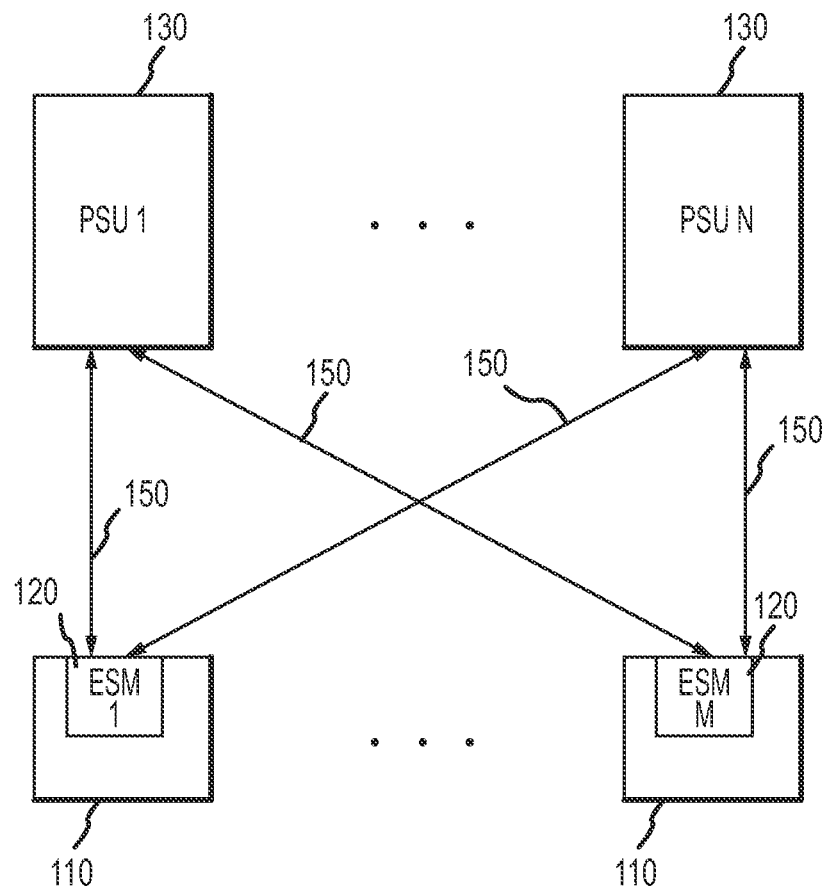
FIG. 4 is a conceptual block diagram depicting the use of multiple PSU and ESM assemblies.

FIG. 4 depicts, conceptually, an embodiment wherein multiple PSUs are associated with and communicate with one or more ESMs in a "cross-strapped" configuration. That is, any number (N) of PSUs 130 are coupled to respective M ESMs within corresponding payload units 110. Each ESM 120 is coupled to its PSU via a single-wire interface 150, as described herein. In accordance with another aspect, intelligence is built into the system such that particular PSUs 130 are correctly matched to the correct, corresponding ESMs 120, thereby verifying the connection. This may be accomplished in a variety of ways. In one embodiment of a verification system, for example, each ESM (and corresponding PSU) includes memory storing a unique code that is also known by the corresponding PSU, such that the appropriate connectivity may be automatically verified (and suitably indicated) by the ESM and/or the PSU.

Figure 5:
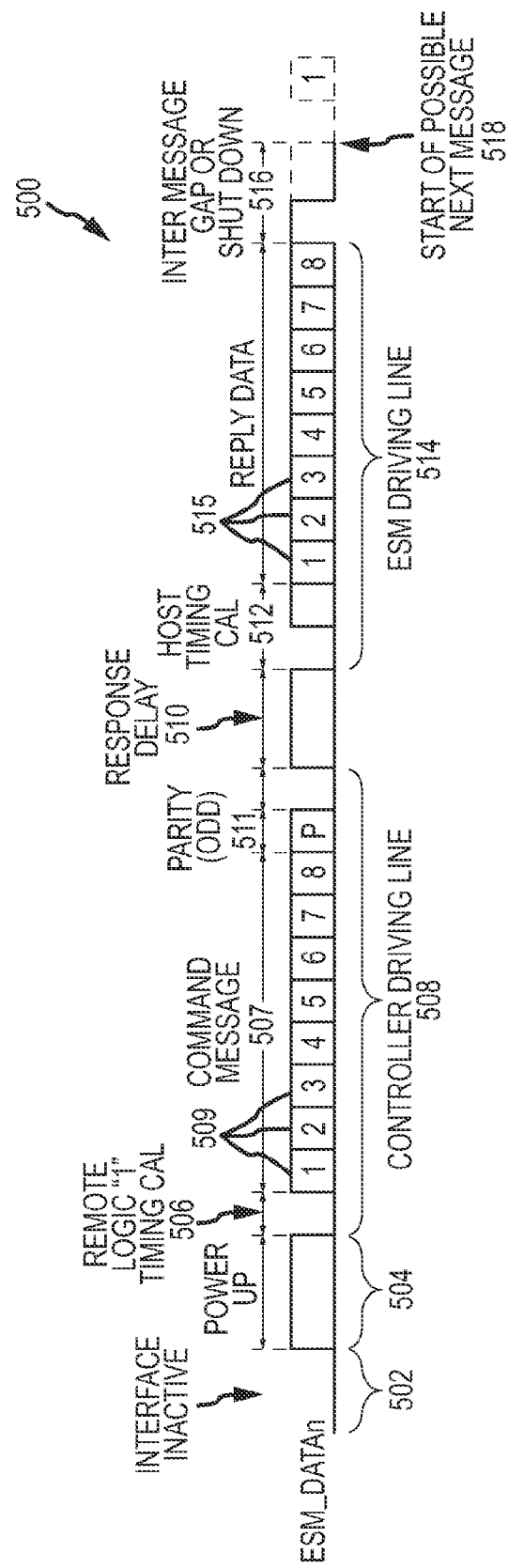
FIG. 5 is a timing diagram, in accordance with one embodiment, associated with telemetry and command data communicated over the single-wire interface.

FIG. 5 depicts an exemplary timing diagram for transmitting data over the single wire interface described above—i.e., both command message and reply data asynchronously. The illustrated signal also functions to provide power to the ESM. As shown, the ESM_DATAn bit stream is characterized by a number of regions. In region 502, the interface is inactive (no data communication). During the power up region (504) a number of consecutive bits (e.g., 64 bits or any other number of bits) are transmitted. It is this stream of bits that will be used by the ESM to provide its internal power (through power strobing module 210).

Next, region controller driving line region 508 includes a timing bit 506 and a command message 507. In region 506, a remote logic "1" is provided for calibrating proper timing. That is, in a method according to one embodiment, the system calibrates the internal timing of the ESM based on the plurality of commands and the plurality of telemetry data. In one embodiment, the logical state of each data bit is determined by the length (duration) of the respective bit (or period between transitions), rather than its voltage level. Thus, for example, a logic "1" may be specified by a 8 us period between transitions, while a logic "1" is specified by a longer, 16 us period between transitions. The periods in region 506 therefore provide information used to calibrate the ESM so that it can recognize the difference between data bit states. In accordance with one embodiment, a non-return-to-zero (NRZ) line code, as that term is known in the art, is used for representing the binary bits.

Command message 507 includes a series of bits 509 (e.g., eight bits) followed by a parity bit 511 (e.g., an "odd" parity bit). The controller driving line 508 is followed by a suitable response delay 510.

Region 514 includes an ESM driving line, which itself consists of host timing calibration region 512 followed by a series of data bits 515 composing the reply data. This is followed by an inter-message gap or shutdown region 516. Subsequent messages 518 may then follow in the same manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A telemetry and command system comprising:
   a payload unit configured to respond to a plurality of commands and generate a plurality of telemetry data;
   a payload power distribution unit connected to and configured to provide power to the payload unit through a first interface;
   an embedded service module (ESM) in the payload unit;
   a payload service unit (PSU) configured to generate the plurality of commands and receive the plurality of telemetry data; and
   a single-wire second interface coupled between the ESM in the payload unit and the PSU, the first interface configured to provide power to the ESM and the single-wire second interface configured to communicate bidirectionally the plurality of telemetry data and the plurality of commands between the ESM and the PSU.

2. The system of claim 1, wherein the ESM includes a single mixed-signal application-specific integrated circuit (ASIC).

3. The system of claim 1, wherein the ESM includes a power strobing module configured to convert the power to the ESM through capacitive storage of a signal associated with the plurality of commands communicated by the PSU to the ESM.

4. The system of claim 3, wherein the power strobing module is configured to convert the power based on a series of transferred digital bits associated with a predefined voltage.

5. The system of claim 4, wherein the series of digital bits includes between 8 and 64 digital bits at a predetermined voltage transmitted in conjunction with the commands and telemetry data.

6. The system of claim 1, further including a second payload unit having a corresponding second ESM embedded therein, wherein the second ESM is coupled to the PSU.

7. The system of claim 6, further including a verification system configured to indicate whether the second ESM is coupled to the correct PSU.

8. The system of claim 1, wherein the commands and the telemetry data are communicated over the single-wire second interface using a serial stream of bits whose logical state is indicated by time periods between voltage transitions.

9. A method for communicating telemetry and command signals, comprising:
   providing a payload unit configured to respond to a plurality of commands and to generate a plurality of telemetry data, the payload unit having an embedded service module (ESM) embedded therein;
   providing power to the payload unit through a single-wire first interface connected to a payload power distribution unit;
   providing a payload service unit (PSU) configured to generate the plurality of commands and receive the plurality of telemetry data;
   connecting a single-wire second interface between the ESM embedded in the payload unit and the PSU;
   powering the ESM over the single-wire first interface via a signal associated with the plurality of commands; and
   transmitting and receiving the plurality of commands and the plurality of telemetry data entirely over the single-wire second interface using a serial stream of bits whose logical state is indicated by time periods between voltage transitions, and powering the ESM.

10. The method of claim 9, wherein providing the payload unit includes providing a payload unit having an ESM with a single mixed-signal application-specific integrated circuit (ASIC).

11. The method of claim 9, wherein the ESM provides the power to the ESM through capacitive storage of a signal associated with the plurality of commands communicated by the PSU to the ESM.

12. The method of claim 11, wherein the power is transferred via a series of digital bits associated with a predefined voltage.

13. The method of claim 12, wherein the series of digital bits includes between 8 and 64 digital bits at a predetermined voltage transmitted in conjunction with the commands and telemetry data.

14. The method of claim 9, further including providing a second payload unit having a corresponding second ESM embedded therein and coupling the second ESM to the PSU.

15. The method of claim 14, further including automatically verifying whether the second ESM is coupled to the correct PSU.

16. The method of claim 9, further including calibrating the internal timing of the ESM based on the plurality of commands and the plurality of telemetry data.

17. The method of claim 9, wherein the commands and telemetry data are communicated over the single-wire second interface using a non-return-to-zero line code.

18. A spacecraft configured to communicate telemetry and command data with a base unit, the spacecraft including:
   a payload unit configured to respond to a plurality of commands and generate a plurality of telemetry data;
   a payload power distribution unit connected to and configured to provide power to the payload unit via a first interface;
   an embedded service module (ESM) within the payload unit;
   a payload service unit (PSU) configured to generate the plurality of commands and receive the plurality of telemetry data; and
   a single-wire second interface coupled between the ESM within the payload unit and the PSU, the first interface configured to provide power to the ESM and the single-wire second interface to communicate bidirectionally the plurality of telemetry data and the plurality of commands between the ESM and the PSU using a serial stream of bits whose logical state is indicated by time periods between voltage transitions.

19. The spacecraft of claim 18, wherein the payload unit is a satellite payload unit.

\* \* \* \* \*